Dec. 7, 1965    R. L. HOELZER ETAL    3,221,978
PACKAGE
Original Filed June 2, 1955    3 Sheets-Sheet 1
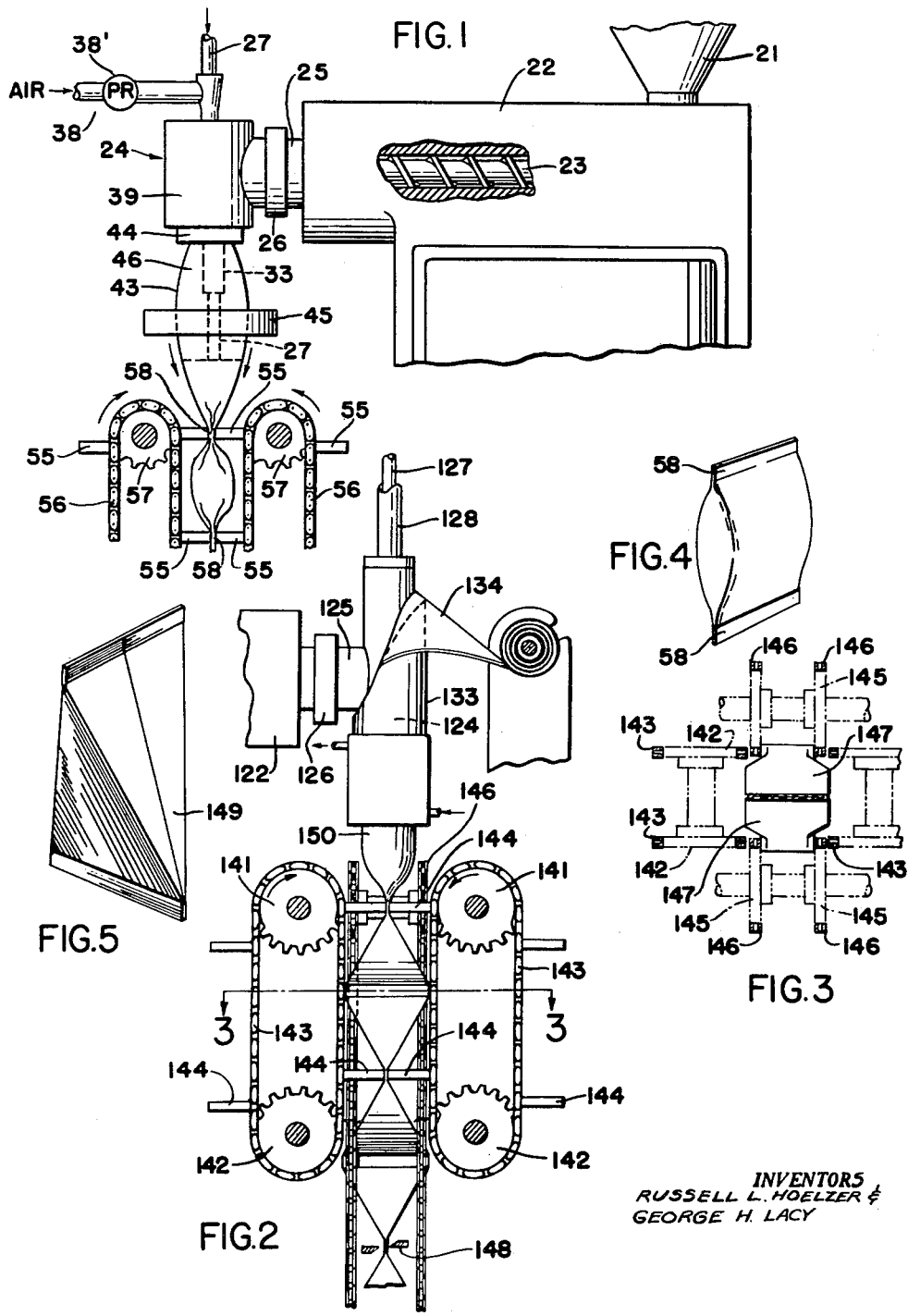
INVENTORS
RUSSELL L. HOELZER &
GEORGE H. LACY Dec. 7, 1965    R. L. HOELZER ETAL    3,221,978
PACKAGE
Original Filed June 2, 1955    3 Sheets-Sheet 2
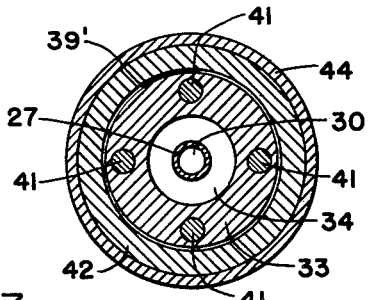
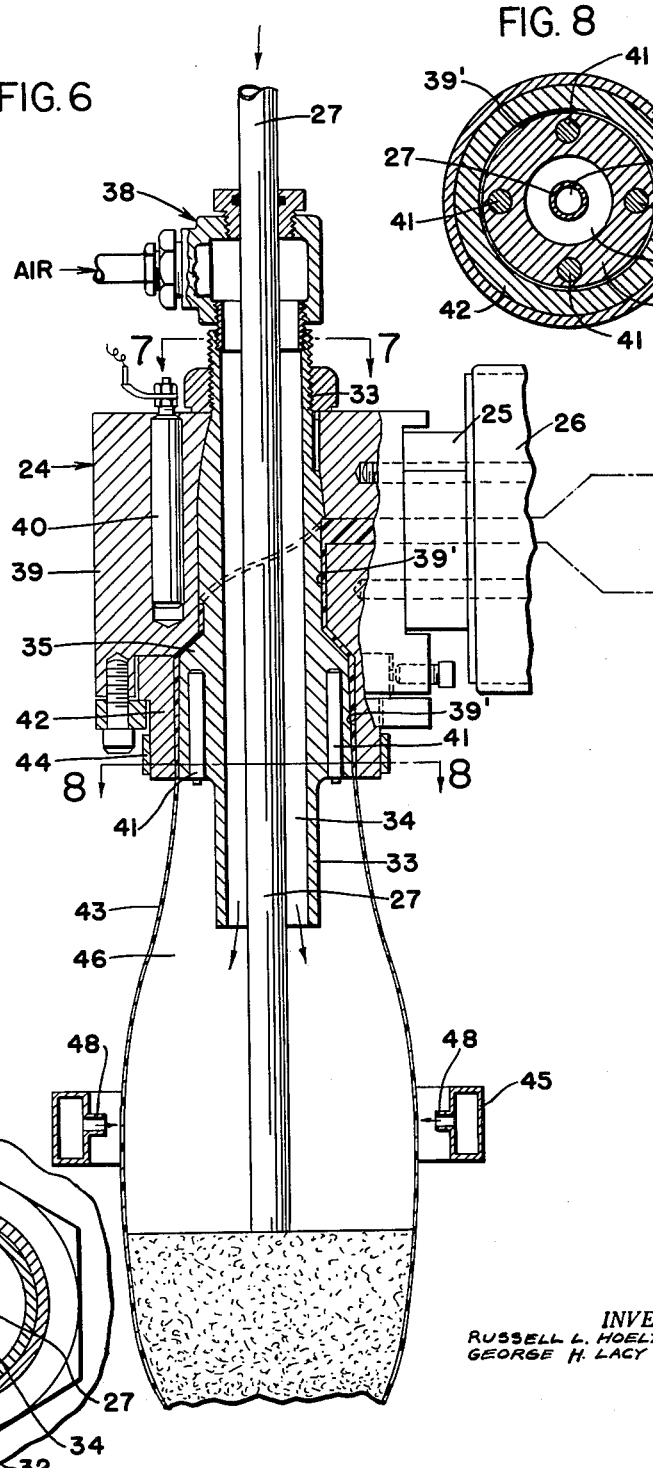
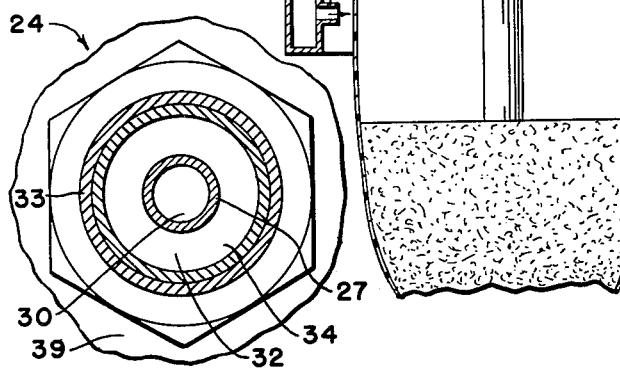
INVENTORS
RUSSELL L. HOELZER &
GEORGE H. LACY

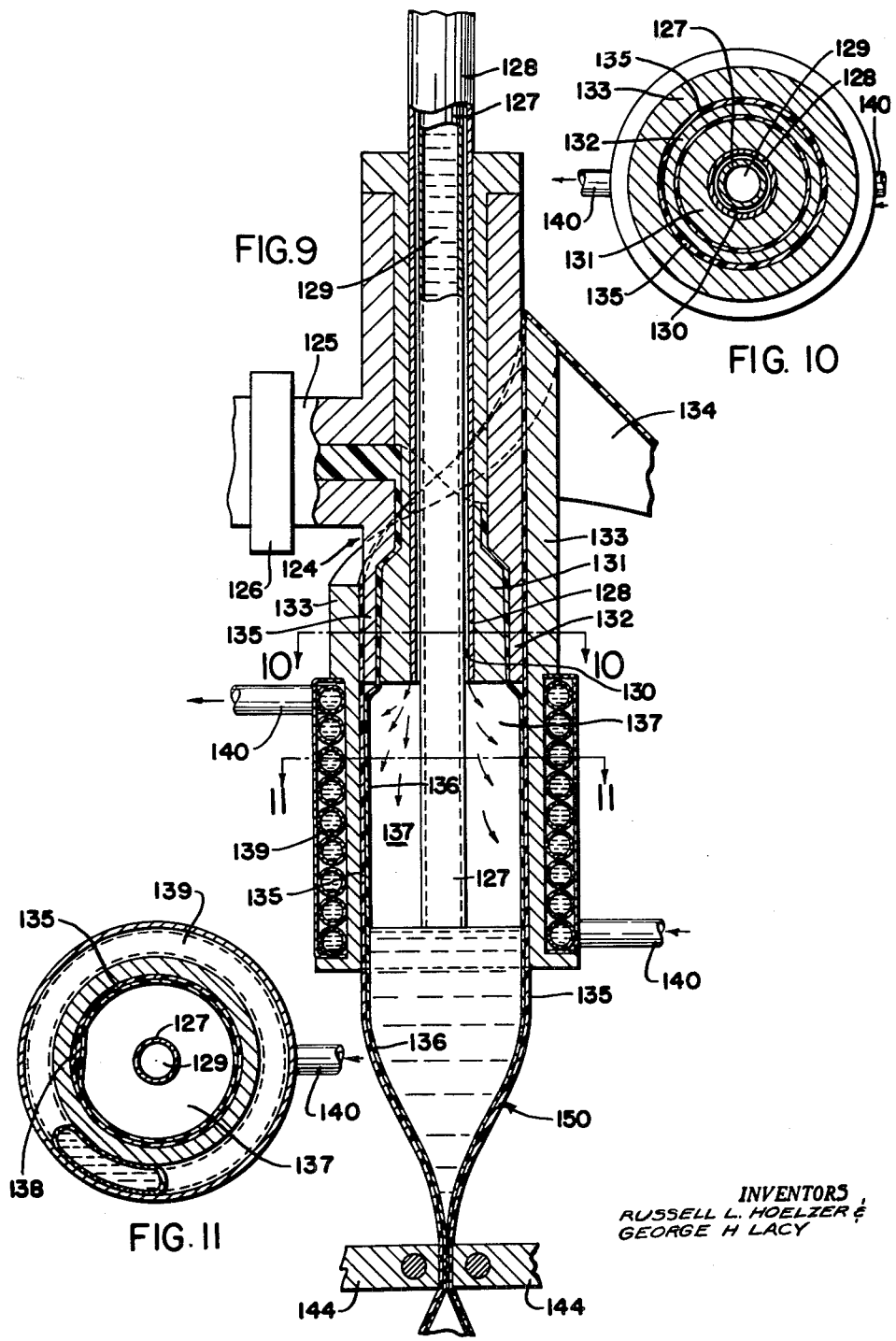

United States Patent Office 3,221,978
Patented Dec. 7, 1965

3,221,978
PACKAGE
Russell L. Hoelzer, Fairview Park, and George H. Lacy, Cleveland, Ohio, assignors, by mesne assignments, to The Dow Chemical Company, Midland, Mich., a corporation of Delaware
Application June 2, 1955, Ser. No. 512,781, now Patent No. 2,962,843, dated Dec. 6, 1960, which is a continuation of abandoned application Ser. No. 480,494, Jan. 7, 1955. Divided and this application Dec. 5, 1960, Ser. No. 94,098
10 Claims. (Cl. 229—53)

This application is a divisional application based on our prior application, Serial No. 512,781, filed June 2, 1955, now United States Patent No. 2,962,843, issued December 6, 1960, itself a continuation of our prior application for Packing Method, Apparatus, and Package, Serial No. 480,494, filed January 7, 1955 (now abandoned).

This invention relates to improvements in methods and apparatus for making, filling, and sealing tubular containers having seamless walls or, at least, walls having a component which comprises a tube of resinous material free of a longitudinal seam. This invention further relates to a novel package in which said resinous seamless tubular element is reinforced with a web of backing material.

Heretofore efforts have been made to overcome the expense and complexity of bag filling and closing equipment by forming a tube of flexible film or like web material, advancing and sealing the tube transversely shortly after the tube was formed, filling the sealed tube (through a spout around which the tube was formed) with a measured amount of the contents to be packaged, advancing the tube and sealing it transversely to complete the packaging of the contents and to provide a seal for the succeeding package. Such equipment has enjoyed much commercial success, but not to a degree commensurate with the theoretical advantages over conventional bag filling and sealing equipment. An inherent disadvantage has been that the tube has been formed of a web of material joined at a longitudinal seam; the seam in the tube was not only a point of weakness in the final package, but the contents were filled shortly after the seam had been formed; either the operation had to be slowed to a relatively uneconomical rate to permit the seam to set before it was subjected to the load of filling the contents, or the seam was likely to burst under the load of the filled contents.

Another objection to the foregoing type of operation was that it was difficult to reinforce the tube, if made of a flexible resinous film, with a suitable reinforcing web, say of paper, fabric, or the like. If the reinforcing web were applied after the tube was formed, it was difficult to secure a reliable bond between the web and tube of film. Generally, the reinforced tube was formed of a web of resinous material laminated or coated on a reinforcing web prior to forming the web into a tube. This left a longitudinal seam which was especially troublesome. If the longitudinal seam was a lap seam, a raw edge of the backing web would be exposed to the packaged contents, through which liquid contents, especially, could wick or bleed. To overcome such wicking action, the expedient of forming a face-to-face seam of the internal film has been tried. This expedient not only provided a seam which was generally weaker than a lap seam but produced an outstanding external fin; this fin interfered with the effective transverse sealing of the tube to provide bottom and top closures and was liable to be damaged or torn in handling the package.

The foregoing objections to prior art continuous package forming and filling operations have been such that the art has even tried the expedient of forming a long length of seamless plastic tubing, filling the entire tube with a product to be packaged, and then, at regular spaces along the tube, pushing away the contents to allow opposite faces of the tube to be brought together and heat-sealed to form individual, severable packages. This expedient, a variation of the sausage filling and forming art, is not economical for general liquid and pulverized or comminuted solid commodities, at least at plant space and labor costs prevailing in the United States.

It is an object and advantage of this invention to overcome the foregoing objections to the prior art, while achieving the results the prior art hoped to obtain, by providing apparatus and methods which will permit the continuous extrusion of a seamless tube of resinous film or film-forming material (such as polyethylene, vinyl polymers and like resins which are flexible at normal temperatures, with or without plasticizers), the reinforcement of the extruded tube, if desired, with one or more lamina of a reinforcing web securely bonded to the tube and joined with a relatively smooth lap or butt seam having no edges exposed to the packaged contents, filling the tubing with liquid or flowable solid contents, and then sealing the tubing to provide closures for successive packages.

It is an object and advantage of the present invention that the packages may be formed with end closures for tubes of the foregoing wall construction with parallel end closures to provide conventional pillow-shaped packages or with end closures extending in transverse directions to provide a novel package having straight longitudinally-extending corners and no substantially curved surfaces or corners. This latter package, which is tetrahedral in form, may be nested in conventional shipping cartons with a minimum of waste volume and, consequently, a substantial reduction in the possibility of damage to the contents during shipping and handling.

Another object and advantage of this invention is that the packages may be produced continuously, even without stoppage for the supply of material from which the containers are made. Substantial economies in production and handling costs are thereby effected.

A particular advantage of the present invention is that the packages produced eliminate any likelihood of liquid contents wicking out while eliminating longitudinal seams and folds that have heretofore been a source of weakness in reinforced packages having a tubular component of film.

Other objects and advantages of the present invention will become apparent from the following detailed description which will refer to the accompanying drawings in which:

FIGURE 1 is a side elevation, partly broken away and partly shown diagrammatically, of one form of the appartus for making the packages shown in FIGURE 4;

FIGURE 2 is a side elevation, partly broken away and partly shown diagrammatically, of another form of the apparatus for making reinforced packages having the tetrahedral shape shown in FIGURE 5;

FIGURE 3 is a cross-section taken along line 3—3 of FIGURE 2;

FIGURE 4 is a prespective view of the package made by the apparatus shown in FIGURE 1;

FIGURE 5 is a perspective view of the package made by the apparatus shown in FIGURE 2;

FIGURE 6 is a detailed elevation, partly in section, of the tube-forming portion of the apparatus shown in FIGURE 1;

FIGURE 7 is an enlarged cross-section taken along line 7—7 of FIGURE 6;

FIGURE 8 is a cross-section taken along line 8—8 of FIGURE 6;

FIGURE 9 is a detailed elevation, partly in cross-section of the tube-forming portion of the apparatus shown in FIGURE 2;

FIGURE 10 is a cross-section taken along line 10—10 of FIGURE 9; and

FIGURE 11 is a cross-section taken along line 11—11 of FIGURE 9.

The embodiment shown in FIGURES 1, 6, 7 and 8 will be described first. In FIGURE 1, a hopper 21 is provided for feeding comminuted resinous material to the feed screw 22. The hopper 21 is of such capacity that the feed screw 22 will continuously feed resinous material without interruption. The feed screw 22 is provided with heating elements, for example, electrical resistance heaters, around the conveyor screw 23 for rendering the resinous material plastic and flowable. The plastic resinous material is moved toward the extruder head, indicated generally at 24 through pipe 25. To prevent any cooling of the plastic resinous material as it passes through the pipe 25 to the extruder head 24, a heater 26 may be disposed thereabout.

The extruder head 24, as best shown in FIGURE 6, is provided with a plurality of concentric spaced tubes to provide passages extending from above the extruder head to points below the head, for purposes which will be described hereinafter. The central tube 27 is best shown in FIGURES 7 and 8, and, as will be seen, it forms the central passage 30. Disposed concentrically about and spaced from tube 27 is a sleeve element 33 which not only forms an annular passage 34 with the tube 27 but also, as will be described below, constitutes an inner die 35 for forming the continuous tubular member from the plastic resinous material. A conventional inlet and outlet fitting shown at 38 is provided for communication with the passage 34. The extruder head 24 is provided with an outer die 39, which cooperates with the inner die 35 to form a passage 39' for shaping the plastic resinous material into the tubular form. The outer die 39 is provided with one or more electric heater elements 40 to maintain proper temperatures in the head. Similarly, the inner die 35 is provided with heater elements 41. At the lower end of the head 24 there is provided a final outer shaping die 42 which is secured to die 39 and cooperates with the lower end of the inner die 35 to produce the resinous film tube shown at 43. About the die 42 there may be provided another heater element 44 for maintaining the plastic material at the proper temperature.

As the plastic resinous tubular film emerges from the extruder head, it is blown to increase the cross-sectional area of the tubular element by stretching the walls transversely, and also, as will be explained below, the resinous plastic material is cooled by an air collar 45 to a temperature below its melting or plasticity point to form a stable flexible film.

The resinous tube 43, as it emerges from the extruder head 24, is still in a plastic condition and would normally tend to collapse against itself. To prevent such collapse and to expand the tube radially, air or other inert gas is supplied to the zone 46 inside the tube 43. The air is passed through inlet 38 to the annular passage 34 and then down this passage to the lower extension of sleeve 33. The air is maintained at a pressure slightly in excess of the surrounding external pressure under the control of a conventional sensitive pressure regulator valve 38'.

In order to effect a cooling of the plastic tube 43 as it passes the air collar 45, cold air or other coolant is projected from the jets 48 associated with the air collar 45. The coolant effectively and uniformly cools the blown resin tube. The tube normally tends to shrink slightly as it is cooled below its plasticity point.

As shown best in FIGURE 1, the seamless film tube 43, after passing below the air collar 45, is flattened by the heat-sealing bars which press opposed sides of the tubular element together, as shown, and heat seal the tube along a transverse line substantially normal to the axis of the tubular element.

As mentioned hereinbefore, a liquid product or a solid product in divided form may be packaged with this apparatus. The product to be packaged is introduced through the innermost tube 27. The product may be introduced continuously or intermittently, as will be described below. The presence of a liquid product in the film tube of most suitable resins does not interfere in any way with an effective and strong heat seal of opposite faces of the tube, even when the liquid level is normally above the location where the actual sealing operation takes place. The temperature and duration of the usual sealing operation does not have an effect on the average liquid product; but when liquids which are particularly heat-sensitive are to be packaged, it may be desirable to introduce the product intermittently, both to prevent the liquid contents from being heated and so that a small quantity of air may be trapped above the liquid level in each package to allow for expansion of the product, if advisable.

Various types of heat-sealing mechanisms may be used, but those illustrated in the drawings are particularly suitable for the continuous operation characteristic of the present invention.

As seen in FIGURE 1, a series of sealer bars 55 are mounted in spaced relation on chains 56. The chains 56 are driven in synchronism by drive wheels 57 so that each sealer bar on one chain will cooperate with a sealer bar on the other chain to flatten the film tube and press the opposed walls together to form a seal 58. The sealer bars are heated by conventional means such as electrical resistance units. When in operation, the sealer bars and the film tube pass downwardly together at the same speed, thus forming a plurality of spaced parallel heat seals 58, two of which are seen in FIGURE 1. A short distance below the heat-sealing mechanism, conventional cutting means (not shown in FIGURE 1) are provided for cutting the seal between successive packages, thus forming a plurality of separate pillow-shaped packages, as shown in FIGURE 4.

As shown in the drawings, each heat seal may be of sufficient width to permit the seal to be cut between its lateral edges so that each seal as made becomes, after cutting, the upper seal for the lower package and the bottom seal of the next succeeding package. Of course, if desired, the heat-sealing mechanism may be arranged so as to form a plurality of spaced pairs of heat-seals, the seals of each pair being relatively close together. In this form, the cutting operation may be effected between the seals of each pair of seals.

It will, of course, be understood that a variety of different shaped heat seals and associated cutting devices may be employed, if desired. For example, the finished package can be furnished with a filling nipple if the sealer bars are configured to seal the film tube along a suitably curved or located transverse line.

When the product, whether a liquid or a divided solid material such as powder, granulated material or even larger-sized material, is fed intermittently, the quantity introduced through tube 27 can be a specified measured amount which will have a smaller volume than that of the finished package. Under such circumstances, a measured quantity of the product is introduced into the tube just above and shortly after a seal has been made. After the measured quantity of product has been deposited in the package, a second seal is made above the top level of the product in the tube. Shortly after the last-mentioned seal has been made, another measured quantity of the product is introduced, and the cycle is repeated.

It will be clear that the distance between the seals, which determines the length of the finished package, may be varied by merely changing the location of the pairs of sealer bars 55 on the chains 56.

The embodiment shown in FIGURES 2, 3, 5, 9, 10 and 11 is particularly adapted for the production of reinforced containers having a continuous longitudinally seamless liner of a resinous material. The outer wall of such packages may consist of paper or other fibrous webs as non-fibrous films to which the extruded resin will be adherent. Such reinforced packages have numerous advantages over the single-walled package described above. For example, the moisture impermeability may be greatly increased, the rigidity of the package may be increased, and printed matter may be easily provided by printing on the outermost reinforcing web as or before the web is supplied to the apparatus. Conventional web-joining means (not shown) allows successive rolls of the reinforcing web to be supplied to the apparatus without interrupting the operation of the apparatus.

As shown in FIGURES 2 and 5, a terahedral package can be formed by this modification, although the pillow-type may be formed by using the sealing mechanism shown in FIGURE 1, if desired. Many other types and shapes can be formed by varying the shape and relative location of the sealer bars and/or cutters.

Referring particularly to FIGURES 2 and 9, a feed screw 122 similar to feed screw 22 of FIGURE 1, supplies the plastic resinous material to an extruder 124 through pipe 125, which may be heated by the heater 126. As shown best in FIGURE 9, the extruder 124 comprises two concentric tubes 127 and 128 which extend from above the head 124 and downwardly therethrough. These tubes form a central passage 129 for the product to be packaged and an annular passage 130 for introducing air or other gas to expand the film tube, as will be described further below.

An inner die member 131, surrounding the tube 128, and an outer die member 132 are provided for forming the plastic resinous material into a tube similar to the extrusion step of the first-described embodiment. The extruder head 124 may be provided with heater elements (not shown), similar to those shown in FIGURE 6.

A tubing sleeve 133 surrounds the outer die 132 and is spaced therefrom to accommodate a web of paper 134 as it is drawn over the sleeve 133 and tubed into the outer tubular reinforcement 135. The marginal edges of the web 134 are overlapped as shown at 138 in FIGURE 11 and are joined together in a lap seam by an adhesive applied in any conventional manner, which has not been illustrated in order to simplify the drawings.

Immediately below the extruder head 124 there is provided an expansion chamber 137 and a cooling casing 139. As will be seen in FIGURE 9, just as the resinous tube 136 emerges from the dies 131 and 132, it has a smaller cross-section than the web 134, which has been tubed by the sleeve 133 to form the outer reinforcement 135. The expansion chamber 137 is maintained under a super atmospheric pressure by supplying air or other inert gas through annular passage 130. Thus, as the resinous tube 136 emerges from the dies, it is expanded against the tubular casing 135 to form a multi-walled tubular element. Since, at this stage, the tube 136 is still in a plastic flowable condition, it will, when suitable reinforcing web materials such as paper are used, adhere to the outer wall 135 and be bonded thereto.

The paper reinforcing tube 135 will tend to cool the resinous tube 136 below its plasticity point and fix it as a seamless tube of stable film. The coiling casing 139, containing a coiled tube 140 for water or like coolant, cools the lower end of the tubing sleeve 133 which, in turn, cools the paper of the reinforcing tube 135 and prevents it from being raised to a temperature which would char or dehydrate the paper and thereby weaken the reinforcement afforded. Thus, as the bonded tubes 136 and 135 are drawn down the chamber 137, they are united into an integral tube 150 having a seamless film liner and a lap-seamed reinforcement. It is to be understood, of course, more than one reinforcing web may be formed in a tube around the film tube 136 to form a multi-ply reinforcement; in such cases the marginal edges of the individual plies are preferably joined by a butt seam, the butt seams of different plies being spaced from each other. In any case, liquids to which the film liner is inert) may be packaged without danger of wicking into the outer reinforcing ply, and the reinforcing ply (or plies), though seamed longitudinally, has no outstanding fin or margin which interferes with subsequent sealing or is liable to be torn in handling.

One means for filling the completed tube 150 with liquid is shown in FIGURE 9 and comprises simply the tube 127, which opens into the lower end of the expansion chamber 137 to permit the liquid product to be packaged to flow into the tube 150 above heat-seal bars 144 closing the end of the container tube. As the heat-seal bars lower, more liquid will flow into the expansion chamber. Liquid is fed into the tube 127 through a suitable control valve, not shown, which correlates the volume of liquid fed to the rate of continuous downward travel of the container tube 150 to maintain the liquid at operating levels within the lower end of the chamber 137.

The heat-seal bars closing off the end of the reinforced container tube 150, and drawing the tubing through apparatus at a rate timed to the feed of the feed screw 122, may be bars similar to the bars shown in FIGURE 1 for forming a pillow-shaped package. The reinforced tube formed in the embodiment shown in FIGURE 9 is particularly adapted, however, for use in forming tetrahedral packages as shown in FIGURE 5. (It is to be understood that the unreinforced container tubing as produced in the embodiment shown in FIGURES 1 and 6 may also be formed into a tetrahedral package.)

The means for forming the container tubing with a tetrahedral package is shown in FIGURES 2 and 3. Spaced from the container tube 150 are two pairs of parallel upper drive sprockets 141 and two pairs of lower drive sprockets 142 carrying four chains 143. Each pair of the chains 143 carries a series of heat-seal bars 144, each of which is brought into opposition with a corresponding bar carried by the other pair of chains adjacent the upper sprockets 141 to heat-seal the tube 150 as the bars and tube move downwardly in synchronism. Disposed at right angles to the sprockets 141 are upper sprockets (not shown) and lower sprockets 145, corresponding to the sprockets 143; these sprockets carry four chains 146 which, in turn, carry opposed pairs of heat-seal bars 147. The heat-seal bars 147 move in unison with the bars 144 but seal the tube 150 on a line spaced from but at right angles to the seal effected by the bars 144. These staggered perpendicular seals form the tube into tetrahedral shapes which, when separated by suitable knives 148, form the individual tetrahedral packages 149. As contrasted with the pillow-shaped package as shown in FIGURE 4, the tetrahedral package 149, having substantially uncurved planar surfaces, may be compactly nested in a rectangular shipping carton with no space between the packages, a face of one package fitting against the face of an adjacent package. When so nested, the packages 149, which are reinforced and strong individually, can stand substantial shipping shocks without ruptures.

As indicated above, seamless film tubes may be made of any suitable plastic material which is extrudable and heat-sealable, of which materials, polyethylene resin and various vinyl resins (plasticized with suitable plasticizers or unplasticized if of suitable flexibility) are illustrative but not limitative examples. As is also apparent, the concentric arrangement of the various elements of extruding head permits parallel flow of contents to be packaged, resin, and a reinforcing ply or plies. Except as required for the production of a particular tube construction, the order of concentricity is not material. Thus, for example, it is not necessary that the resin form the inner surface of the tube; the reinforcing ply could be internal. Likewise, while the apparatus and method as disclosed are especially adapted to permit continuous filling and sealing of packages, the tube itself is useful for packaging and other purposes; thus, by omission of heat-sealing bars and package cut-off means, the tubing itself may be produced as an end-product of the extruding head. Likewise by cutting off the tubing in lengths adjacent the heat-seals and omitting the filling operation, bags may be produced. It is to be understood that the terms "fused" and "fusion" define the direct bond at the interface of the continuous tube of thermo-plastic which is obtained when the tube of film material, while still in a flowable plastic condition following extrusion as a molten resin, is forced under pressure against and united with the reinforcing ply, thereby uniting all portions of the interface between the web and seamless tube together.

It is apparent from the foregoing, therefore, that this invention is not limited to the specific embodiments disclosed but only by the appended claims.

What is claimed is:

1. A container comprising a continuous, longitudinally seamless, tubular ply of thermoplastic resinous film material and a ply of fibrous web material fused together throughout the interface between said film and web material, said ply of web material having marginal longitudinal portions joined together in an unfolded condition to provide a longitudinally extending seam, and transversely extruding heat-seals to enclose packaged products.

2. A container as set forth in claim 1 in which said marginal portions overlap.

3. A container as set forth in claim 1 in which said marginal portions abut.

4. A reinforced tube comprising a seamless tube of thermoplastic resinous film and a reinforcing web fused directly thereto throughout the interface between said film and web, said web having longitudinal marginal portions, said marginal portions being joined together in a longitudinal seam not exceeding two thicknesses of said reinforcing web.

5. A multi-ply tubing for packaging and the like comprising a plurality of plies, one of said plies being a relatively continuous extruded flexible seamless tube of thermoplastic film, and a first adjacent reinforcing ply bonded directly to said tube by fusion of said web at all portions of the interface therebetween, longitudinal marginal portions of said reinforcing web being joined together by a longitudinal seam not exceeding two thicknesses of said web.

6. A multi-ply tubing as defined in claim 5 in which said film is formed of a resin of the class consisting of plasticized and unplasticized poleythylene and vinyl polymers and said reinforcing web is of the class consisting of fibrous webs and non-fibrous films.

7. A multi-ply tubing as defined in calim 6 in which said reinforcing web is paper.

8. A multi-ply tubing as defined in claim 5 including a second reinforcing web adjacent said first reinforcing web, the longitudinal marginal portion of each reinforcing web being joined by longitudinal butt seams, the seam of the first reinforcing web being spaced from the seam of the second reinforcing web.

9. A multi-ply tubing as defined in claim 5 in which said longitudinal seam in said web material is a butt seam.

10. A multi-ply tubing as defined in claim 5 in which said longitudinal seam in said web material is a lap seam.

References Cited by the Examiner

UNITED STATES PATENTS

| | | | |
|---|---|---|---|
| 2,297,375 | 9/1942 | Vogt | 229—55 |
| 2,301,128 | 11/1942 | Landefeld. | |
| 2,430,995 | 11/1947 | Roos. | |
| 2,741,079 | 4/1956 | Rausing. | |
| 2,962,843 | 12/1960 | Hoelzer. | |

GEORGE O. RALSTON, *Primary Examiner.*

EARLE J. DRUMMOND, FRANKLIN T. GARRETT,
*Examiners.*